(12) United States Patent
Eira et al.

(10) Patent No.: US 11,139,893 B2
(45) Date of Patent: Oct. 5, 2021

(54) METHOD AND SYSTEM FOR MEDIA CHANNEL FORMAT SET MANAGEMENT IN OPTICAL TRANSPORT NETWORKS

(71) Applicant: Xieon Networks S.a.r.l., Luxembourg (LU)

(72) Inventors: Antonio Eira, Amadora (PT); João Manuel Ferreira Pedro, Lisbon (PT)

(73) Assignee: XIEON NETWORKS S.a.r.l., Luxembourg (LU)

(*) Notice: Subject to any disclaimer, the term of this patent is extended or adjusted under 35 U.S.C. 154(b) by 0 days.

(21) Appl. No.: 16/152,865

(22) Filed: Oct. 5, 2018

(65) Prior Publication Data

US 2019/0109644 A1 Apr. 11, 2019

(30) Foreign Application Priority Data

Oct. 11, 2017 (EP) .................................... 17195868

(51) Int. Cl.
*H04J 14/00* (2006.01)
*H04B 10/27* (2013.01)
(Continued)

(52) U.S. Cl.
CPC ............. *H04B 10/27* (2013.01); *H04B 10/66* (2013.01); *H04J 14/026* (2013.01); *H04J 14/0224* (2013.01); *H04L 1/0041* (2013.01)

(58) Field of Classification Search
CPC ...... H04J 14/02; H04J 14/026; H04J 14/0227; H04J 14/0267; H04B 10/27; H04B 10/032; H04B 10/035; H04B 10/038; H04Q 11/0062; H04Q 11/0066; H04Q 11/0067; H04Q 11/0003; H04Q 11/0005; H04L 47/127; H04L 45/02

USPC ........ 398/79, 45, 48, 49, 51, 53, 56, 57, 58, 398/158, 159, 33, 38, 25, 26, 27, 3, 5; 370/235, 254, 230, 468, 352, 392, 401, 370/238, 315

See application file for complete search history.

(56) References Cited

U.S. PATENT DOCUMENTS 9,054,829 B2 6/2015 Patel et al.
9,338,529 B2* 5/2016 Sambo ................ H04J 14/0257
(Continued)

FOREIGN PATENT DOCUMENTS

JP 2016-127354 A 7/2016
WO 2015/162875 A1 10/2015

OTHER PUBLICATIONS

Comellas, J. et al., "Improving Link Spectrum Utilization in Flexgrid Optical Networks," J. Opt. Commun. Netw., vol. 7(7):618-627 (2015).

(Continued)

*Primary Examiner* — Hanh Phan

(57) ABSTRACT

A set of media channel (MCh) widths is determined for an optical network. Based on a topology of the network, a first set of original MCh widths are computed for tentative use in the optical network, the first set of original MCh widths defining a target spectral efficiency. A reduced set of new MCh widths are generated from the first set of MCh widths by respectively mapping each of the original MCh widths of the first set of original MCh widths to a corresponding, or respective, new MCh width. An optimization algorithm is used in an example embodiment to facilitate the mapping.

36 Claims, 5 Drawing Sheets

(51) Int. Cl.
*H04L 1/00* (2006.01)
*H04B 10/66* (2013.01)
*H04J 14/02* (2006.01)

(56) References Cited

U.S. PATENT DOCUMENTS

2008/0298805 A1* 12/2008 Lee .................... H04J 14/0227
398/48
2012/0051745 A1 3/2012 Srinivasan et al.
2013/0272710 A1 10/2013 Wang et al.
2016/0072608 A1 3/2016 Wright et al.

OTHER PUBLICATIONS

Extended European Search Report, European Application No. 17195868.9, dated Apr. 16, 2018, 10 pages.
Gonzalez, O. et al.: "Framework and Requirements for GMPLS-Based Control of Flexi-Grid Dense Wavelength Division Multiplexing (DWDM) Networks rfc7698.txt," Framework and Requirements for GMPLS-Based Control of Flexi-Grid Dense Wavelength Division Multiplexing (DWDM) Networks RFC7698.TXT, Internet Engineering Task Force, IETF, Standard, Internet Society (ISOC) 4, pp. 1-42 (2015).
Moniz, D. et al., "On the comparative efficiency of non-disruptive defragmentation techniques in flexible-grid optical networks," Optical Switching and Networking, vol. 25:149-159 (2017).
Pedro J. "Designing transparent flexible-grid optical networks for maximum spectral efficiency [Invited]," Journal of Optical Communications and Networking, Institute of Electrical and Electronics Engineers, US, vol. 9(4):(2017).

* cited by examiner

Header: NE ID
Content:
<Direction ID_1>; <MCh width Set calculate 1>
...;
<Direction ID_n>; <MCh width Set *n*>

METHOD AND SYSTEM FOR MEDIA CHANNEL FORMAT SET MANAGEMENT IN OPTICAL TRANSPORT NETWORKS

PRIORITY INFORMATION

This application claims priority to and the benefit of European Patent Application No. 17195868.9, filed in the European Patent Office on Oct. 11, 2017, the entire contents of which are incorporated herein by reference.

FIELD OF THE INVENTION

The present invention is in the field of optical network technology. In particular, the invention relates to a method of determining suitable media channel formats that allow for a reduced service provisioning complexity while at the same time allowing for high spectral efficiency. Further aspects of the invention relate to a management system and an off-line planning tool employing such method.

BACKGROUND OF THE INVENTION

Service provisioning in optical transport networks consists, broadly, in assigning network resources to a specific client demand to ensure data connectivity between its endpoints. On the network infrastructure level, it implies assigning to each demand a specific routing path and a spectral window across all traversed links, referred to as a "media channel" in the art. A "media channel" (MCh) is known in the field as a media association that represents both the topology (i.e., path through the media) and the resource (frequency slot) that it occupies. As a topological construct, it represents a frequency slot supported by a concatenation of media elements (fibers, amplifiers, filters, switching matrices, etc. ... ). The term media channel is often used to identify an end-to-end physical-layer entity with its corresponding (one or more) frequency slots at each link filter.

Based on the path information, it is hence necessary to decide on the specific interfaces to be used for creating the optical channel(s), and which parameters they use. This decision usually has some underlying criteria supporting it, such as for example least cost or highest spectral efficiency. Thus, if for instance a 100 Gb/s service is required between two end-points, the service provisioning module of a network management system or software-defined networking (SDN) controller is expected to compute a physical path in the network between those end-nodes. It must also select a set of available transponder modules (or request new ones to be installed), and choose the most suitable parameters for transmission which comprise the so-called "MCh format". The "MCh format" may in particular comprise information regarding modulation format, FEC overhead, symbol rate, number of carriers within the MCh, guard-band size etc.

The selection of the MCh format usually obeys some optimization criteria, for example using the most spectrally efficient modulation format not requiring regeneration for that path. Finally, the system must also allocate a spectral window for the new MCh.

In the current state of the art, transponder modules are evolving from being able to change the modulation format dynamically, to also being able to change the symbol rate and apply varying levels of forward error correction (FEC) overhead. This leads to a widening array of possible single-carrier transmission options for the same target bit-rate that balance spectral efficiency and optical reach.

Additionally, the possibility of logically aggregating multiple carriers into a MCh further increases the amount of options under consideration, as for each carrier type (symbol rate, modulation format and FEC overhead) it is possible to adjust the spacing between carriers, and the guard-bands at the edges of the MCh. This in combination creates greater opportunities for more efficiently using network capacity, but simultaneously adds considerable complexity to the service provisioning and planning processes, as the amount of possible options increases dramatically. Furthermore, the flexibility in terms of granularity with which these different formats, along with the range of MCh line-rates co-existing in the system, may also introduce problems with network fragmentation, where spectral resources become unusable due to misalignment of the channel formats throughout the different network links.

In J. Comellas, and G. Junyent, *"Improving link spectrum utilization in flexgrid optical networks," IEEE/OSA Journal of Optical Communications and Networking, vol. 7, no. 7,* pp. 618-627, July 2015, a Markov-chain based approach is used to estimate the blocking probability of a link in a flexible-grid network based on the profiles of the channel widths used. A comparative analysis of multiple channel sets can indicate whether one set will lead to a higher spectral efficiency than another set.

A very similar approach is presented in H. Beyranvand, M. Maier, and J. A. Salehi, *"An analytical framework for the performance evaluation of node- and network-wise operation scenarios in elastic optical networks," IEEE Transactions on Communications, vol. 62, no. 5,* pp. 1621-1633, May 2014. This document presents a Markov model with two approximations to estimate the blocking probability at the node and network level given a set of channel widths. The analysis in this document is constrained in that it assumes that the available channel widths must take all the values between 1 and K slots, with K an integer number. In other words, if the unit slot or "granularity" was e.g. 25 GHz, it would assume all the channel widths between 25 and K×25 GHz were required in the network.

The method of both of the above documents are trial-and-error methods. In order to assess if a given set of channel widths is more efficient than another one, according to both methods, the respective sets have to be generated first. In a typical deployment scenario with dozens of possible widths, one must manually generate all the candidate sets of widths that would be expected to perform better than the current set (using all candidate widths) and then evaluate them. Moreover, there is no particular method for generating a candidate set, other than some intuitive rules (e.g. aligning all formats under a given fixed grid granularity), which further complicates the process.

Also, the methods of both documents exhibit scalability issues. In the method of Comellas et al., the amount of channel widths considered is quite limited (below 10), as is the number of slots per link (160, when in a 6.25 GHz granularity up to 768 slots would be required). Furthermore, the analysis is limited to a single link, and is then extrapolated to a network-level conclusion, which disregards the effects that having to ensure spectrum continuity across the links of a connection may have on overall fragmentation.

In the method of Beyranvand et al., the amount of slots per link is also below the requirements for current optical transport networks, and the method is shown to seriously degrade its performance as the number of possible channel widths or the number of slots per link increases. The results presented in both documents are tied to specific spectrum assignment methods (e.g., first-fit or random-fit). The blocking estimates depend on the assignment method being used.

Further known are methods for choosing a specific spectral window for a specific channel, i.e. a spectrum assignment method to reduce fragmentation, as is e.g. disclosed in JP 2016127354 (A). Other known methods include the assignment of spectrum to channels based on an entropy fragmentation metric (see e.g. U.S. Ser. No. 14/786,399), or simply splitting the optical spectrum in multiple bands designated to carry spectrum for MChs with specific widths (cf. JP2015/002075).

In other approaches, it is attempted to defragment the network by rearranging the spectral position and/or path of existing connections in order to eliminate stranded bandwidth, as is e.g. disclosed in U.S. Ser. No. 13/445,756 or U.S. Ser. No. 12/945,956.

SUMMARY OF THE INVENTION

As is apparent from the previous section, next-generation transport networks feature an exponential increase in the amount of deployable MCh formats, with a highly granular array of combinations ranging from the most spectrum-efficient but reach-limited formats towards formats with the highest reach but occupying more spectrum.

The explosion of deployable channel formats introduces two main problems. Firstly, the sheer quantity of available options forces a network management system or a network planner to consider a massive amount of MCh combinations for all client demands, taking up considerable time that can delay service provisioning times in online applications managed, for instance, by an SDN controller.

The second problem is that, even if the "best" MCh format for a specific demand is computed (e.g. the one featuring the best spectral efficiency above a given optical threshold), the continuous deployment of these formats with a very high spectrum granularity can lead the network to experience fragmentation problems. The spectral widths of the deployed MChs may be severely mismatched amongst themselves, causing spectrum resources to be wasted when having to ensure spectrum continuity for all the links traversed by a MCh.

A goal of the invention is to provide a method of determining a set of MCh widths to be used in an optical network and a corresponding management system that helps to overcome the above difficulties. This problem is solved by each of a method, a management system, and an off-line planning tool, according to the present invention.

A method of determining a set of MCh widths to be used in an optical network is provided, which according to at least one example embodiment comprises the following steps:

Based on a topology of the network, computing a first set of MCh widths for tentative use in said optical network, said first set of MCh widths defining a target spectral efficiency, and generating a reduced set of MCh widths from said first set of MCh widths by mapping each of the original MCh widths of said first set to a corresponding new MCh width, which is identical with or larger than the original MCh width, thereby decreasing the spectral efficiency as compared to said target spectral efficiency, wherein a plurality of different original MCh widths of said first set of MCh widths are mapped to the same new MCh width to thereby decrease the number of MCh widths in the reduced set of MCh widths.

Herein, said mapping is carried out automatically using an width adjustment module employing an optimization algorithm that penalizes combinations of MCh widths that are more likely to cause fragmentation problems in the spectrum as compared to MCh widths that are less likely to cause fragmentation problems, and penalizes a decrease in spectral width as compared to the target spectral efficiency due to the mapping of an original MCh width of said first set to a new, larger width.

According to at least one example embodiment of the present invention, as further described herein, a reduced set of MCh widths is obtained in a two-step procedure. The method starts out with computing, based on a topology of the network, a first or "original" set of MCh widths for tentative use in the optical network. Herein, the term "tentative" indicates that these MCh channel widths could in principle be used in the network, but the aim of the method is to provide a typically much smaller, i.e. "reduced" set of MCh widths, which allows for the first aspect of the aforementioned problem, as it greatly facilitates the tasks of a provisioning tool or a manual planner.

The first set of MCh widths can be obtained in any conceivable way, and in typical applications, they will be determined to provide the highest possible spectral efficiency without having to provide for additional 3R regeneration. In other words, the computation of the first set of MCh widths can be carried out in a way that the potential of obtaining high spectral efficiencies provided by the very large amount of deployable MCh formats is fully exploited, although at the price of resorting to MChs having many different and in no way matching or related widths. The spectral efficiency obtained with the MCh widths of said first set of MCh widths is therefore typically very high, and is referred to as the "target spectral efficiency" hereinafter. Note that the method does not require that this "target spectral efficiency" is actually computed, but it serves as a reference to which changes in the spectral efficiency introduced in the mapping of the second step are to be compared in some way.

In a second step, a reduced set of MCh widths is generated from said first set of MCh widths by mapping each of the original MCh widths of said first set to a corresponding new MCh width, which is identical with or larger than the original MCh width. Since MCh widths are always maintained or increased, this mapping inevitably leads to a decrease in the spectral efficiency as compared to the target spectral efficiency. Note that the "mapping an original MCh width to an identical width" means leaving the respective original MCh width unaffected, which could be regarded as an "identity mapping" or not mapping the respective MCh width at all. However, while some of the original MCh widths may not be changed upon the mapping, in typical cases, there will be a plurality of different original MCh widths of said first set of MCh widths are mapped to a same MCh width in the reduced set, so that the number of MCh widths in the reduced set is decreased over that of the first set of MCh widths. Note that mapping an original MCh width to a new, larger MCh width typically amounts to adding guard bands to the MCh format originally calculated.

Importantly, the mapping is carried out automatically, by using a width adjustment module employing an optimization algorithm that penalizes combinations of MCh widths that are more likely to cause fragmentation problems in the spectrum as compared to MCh widths that are less likely to cause fragmentation problems, but that also penalizes a decrease in spectral width as compared to the target spectral efficiency due to the mapping of an original MCh width of said first set to a new, larger width. In other words, the algorithm employed by the width adjustment module will steer the mapping of the MCh widths such that combinations of MCh widths less prone to causing fragmentation problems will be preferred. When starting out from a first set of MCh channels with a large variety of different MCh widths, as is typically the case after the MChs have been individually optimized with respect to spectral efficiency as mentioned above, and then carrying out the mapping towards a second set less prone to causing fragmentation problems, this will automatically lead to a considerably lower number of MCh widths, because fragmentation problems can be best avoided with a limited number of matching MCh widths, as will become apparent from the further description explanations below. In other words, the reduction in the number of MCh widths is a natural consequence of employing an optimization that suppresses or penalizes combinations of MCh sets that are prone to fragmentation problems. Of course, the extent to which the number of MChs is reduced by the mapping will always depend on the nature of the first MCh set. If the first MCh set should already happen to be perfect with regard to both, spectral efficiency and fragmentation avoidance, the optimization effected by the optimization algorithm employed by the width adjustment module has no room for improvement, and it may happen that the number of MCh is not reduced. However, in the typical case, as mentioned above, the optimization will automatically lead to a reduction in the number of MCh widths.

While the mapping of MCh widths generally leads to a decrease in spectral efficiency (because the channel widths are either maintained or increased, thereby occupying more of the spectrum), it is seen that in practice, the spectral efficiency need not suffer significantly, because part of the loss in spectral efficiency due to broadening of MCh widths is made up by a decreased loss of useful spectrum due to fragmentation. In other words, much of the high spectral efficiency enabled by the large amount of deployable MCh formats can actually be preserved in the reduced set of MCh widths. Moreover, since the algorithm employed by the width adjustment module further penalizes a decrease in spectral width upon the mapping, the mapping will actually be carried out in a way to further preserve much of the original spectral efficiency. Accordingly, the method leads to a reduced set of MCh widths that is much smaller in number than the original first set of MCh widths, while still permitting nearly as good use of the available spectrum as obtainable with the first set of MChs. In some cases, the use of the spectrum can even be better than that of the original first set of MCh widths, when the benefit of the reduction of fragmentation surpasses the loss of spectral efficiency.

Note that the method of the present invention is not per se a routing and spectrum assignment algorithm, insofar as at least according to one or more example embodiments, it determines the width profiles of the MChs to be assigned before provisioning, which precedes the choice of which spectrum in the optical band to assign to the MChs. However, the method of the present invention can nevertheless be used for example in conjunction with routing and spectrum assignment algorithms. In fact, the present method can be used for example in conjunction with methods such as described in the above referenced patent documents JP 2016127354 A, U.S. Ser. No. 14/786,399 and WO2015/162875 A1.

The skilled person will further appreciate that the present method is not a mere defragmentation method. Defragmentation methods as for example described in U.S. Ser. No. 13/445,756 and U.S. Ser. No. 12/945,956 assume the possibility of rearranging existing connections in order to reduce stranded bandwidth. In many cases, this is not possible without disrupting existing connections, which is not tolerable in most deployment instances. Defragmentation is a reactive procedure, whereas the method of the invention is a proactive measure for preventing fragmentation from arising in the first place.

Moreover, while prior art methods as defined in the patents cited above are focused on reducing fragmentation, they do not consider the benefit in provisioning complexity that may be associated with reducing the set of the MCh profiles available for deployment, as is conveyed by the reduction in the number of MChs in the reduced set obtained with at least example embodiments of the method of the invention.

In a preferred embodiment, said step of computing said first set of MCh widths comprises computing or estimating an expected relevance of each MCh width of said first set in actual data transmission carried out on said optical network, and the algorithm accounts for said expected relevance in said penalizing said decrease in spectral width due to the mapping of an original MCh width of said first set to a new, larger MCh width. This variant makes use of the observation that not all of the MCh widths within the first set have the same relevance, as some of the MCh widths will be very likely to be often employed by a management system upon service provisioning, meaning that a comparatively large part of the available spectrum will be assigned to MChs having this width, while other MCh widths may be of very little relevance, for example MCh widths that have been found particularly suitable only for paths of little priority or for line rates with little demand. Accordingly, when carrying out the mapping of the MCh widths, duly accounting for the expected relevance will further help to limit the decrease in spectral width upon the mapping. Herein, the term "expected relevance" indicates that the relevance will be based on some sort of estimation of prediction of the service demand of the optical network (which may, nevertheless, be based on historical recorded data or live network data).

In a preferred embodiment, said step of computing said first set of MCh widths comprises the steps of
  computing, for at least a part of all pairs of nodes within said network, a predefined number of paths, wherein said path computation is preferably carried out by means of a path computation element of a management system or an SDN controller, and
  determining, for each of said determined paths, and for each of a predetermined number of line rates to be employed on said path, a MCh format that best fulfills a spectral efficiency optimization criterion, wherein said MCh format comprises the MCh width and one or more of a modulation format, a number of carriers within the MCh, a spectral location of carriers within the MCh, a symbol rate, and a FEC overhead.

Note that for determining the best choice for the first set of MCh widths, it is advantageous if said predetermined number of paths is computed for all pairs of nodes within the network. However, this is not strictly necessary, and a useful first set of MCh widths can also be obtained if the computation is restricted to only a part of all pairs of nodes within the network. In some embodiments, the path computation may still be carried out at least for the "predominant part" of all pairs of nodes within the network, i.e. at least 50% thereof. However, in other embodiments, the commutation can be restricted to a considerably lower fraction, particularly if there is a high degree of certainty regarding the node-pairs that will be carrying traffic, which may be the case in some deployments.

Note further that said "spectral efficiency optimization criterion" may in particular be a criterion of obtaining a highest possible spectral efficiency without having to provide for additional 3R regeneration. This way, it can be ensured that the first set of MCh channels, forming the starting point of the method, indeed incorporates the best possible spectral efficiency that can be obtained under the given circumstances, using the power of the variety of modern MCh channel formats. However, other "spectral efficiency optimization criteria" are likewise possible, as long as they help to establish a set of first MCh widths that allow for a good spectral efficiency.

For many purposes it may be sufficient if only a single path was calculated for each pair of nodes under consideration, and the network analysis and determination of the first set of MCh channels was based thereon. However, in preferred embodiments said predefined number of paths computed for each pair of nodes is at least two, preferably at least three, provided that such number of paths between the respective pair of nodes does exist. Obviously, depending on the topology, there will be pairs of nodes connected only by a single, unique path, or only two different paths.

Moreover, in various embodiments, said predetermined number of line rates to be employed on each path is at least three, preferably at least five, and most preferably at least seven. Accounting for such a large variety of line rates ensures that the first set of MCh widths determined does in fact allow for handling a corresponding diversity of service requests employing different line rates. However, the invention is not limited to this. In other embodiments, the required line rates could be decided for the network, based on the available traffic profile and customer requirements, and hence be a static input to the method. There may be embodiments where the deployment features only one or two line rates, while the method would still be useful to align the widths used in the network. It should also be kept in mind that for every given line rate, there may be several MCh formats available, differing with regard to symbol rate, modulation formats and the like. For example, for a given line rate of 200 Gb/s, MCh formats may employ a 16QAM modulation format at 50 GHz, a 8QAM modulation format at 62.5 GHz, or a QPSK modulation format at 87.5 GHz. Each of these correspond to a different MCh format having exactly the same line rate, and the method of the invention can still be used in one or more example embodiments to optimize the MCh format widths even if only one line rate is considered.

In a related embodiment, said aforementioned relevance of each MCh width in said first set of MCh widths is computed or estimated based on the likelihood that a given path employing said MCh width is actually chosen, and/or on the likelihood that on said given path a line rate is required for which said MCh width fulfills said spectral efficiency optimization criterion.

As was explained above, the reduction in number of MCh widths is an automatic result of the optimization algorithm employed by the width adjustment module, such that in various embodiments, the degree of reduction number is not an input to the method, but rather a result thereof, which also depends on the first set of MCh widths. However, in some embodiments, when carrying out the method, the number of original MCh widths in the first set is at least 2× as high as, preferably at least 4× as high as the number of new MCh widths in the reduced set. This reduction in the number of MCh widths that constitute the reduced set already greatly reduces the complexity and the burden on a service provisioning tool or a person manually planning the network.

Note that in some embodiments, the method may include a hard constraint for the maximum number of MCh widths in the reduced set of MCh widths, for provisioning complexity purposes, such that the optimization algorithm will obtain the best possible spectral efficiency compromise at a limited number of MCh widths.

In some embodiments, each of the new MCh widths present in the reduced set of MCh widths corresponds to an original MCh width that is contained in the first set of MCh widths. However, in preferred embodiments, the optimization algorithm may lead to new MCh widths that were not included in the first set of MCh widths.

In a preferred embodiment, the optimization algorithm is constrained by a threshold value defining a maximum decrease in spectral efficiency of the reduced set of MCh width as compared to said first set of MCh widths. This way, it can be ensured that in the automatic generation of the reduced MCh set by the width adjustment module, the loss in spectral efficiency as a direct consequence of the mapping (i.e. not, or at least not necessarily accounting for the factual increase due to avoidance of fragmentation) is kept within prescribed bounds. In this case, the optimization algorithm is bound by a hard constraint regarding the permitted loss in spectral efficiency due to the mapping.

Herein, the threshold is preferably
manually set by a network operator, and/or
dynamically adjusted based on real-time data indicating the degree of spectrum fragmentation actually occurring in the network.

Similarly, the optimization algorithm may be constrained by a threshold value defining a maximum number of MCh widths in the reduced set. This way, the absolute number of MCh widths remaining in the reduced set can be set as a hard constraint, thereby ensuring a desired decrease in provisioning complexity associated with a smaller number of MCh widths. The maximum number of MCh widths remaining in the reduced set can e.g. be manually set by a network operator.

In a preferred embodiment, the optimization algorithm comprises a weighting parameter, in particular a weighting factor, which balances the importance of minimizing fragmentation versus the overall spectrum efficiency. For example, a high weighting parameter may lead to a reduced set of widths less prone to fragmentation problems (and typically smaller number of MCh widths) than a smaller weighting parameter, although at the expense of a decreased spectral efficiency of the individual remaining MCh widths. Such a weighting parameter may hence be used to fine-tune the mapping carried out by the width adjustment module. For this purpose, the weighting parameter may be either manually set by a network operator, or be dynamically adjusted based on real-time data indicating the degree of spectrum fragmentation actually occurring in the network.

As the skilled person will appreciate, the weighting parameter and the threshold value defining the maximum decrease in spectral efficiency of the reduced set of MCh width as compared to said first set of MCh widths are closely related, and in some embodiments, they may be represented by the same parameter if appropriately defined.

In various embodiments, said reduced set of MCh widths is computed iteratively, where in one or more iterations, a reduced set of MCh widths obtained in a previous calculation step is used as said first set of MCh widths.

In preferred embodiments, said optimization algorithm assigns penalty weights to subsets, in particular pairs of MCh widths within said first set of MCh widths in case the MCh widths are not multiples of each other. This embodiment is based on the observation that fragmentation problems can be efficiently avoided if MCh widths are used in combination, which are multiples of each other. Accordingly, by simply penalizing combinations of MCh widths for which this condition is not fulfilled, already a very useful optimization can be carried out. However, clearly more sophisticated penalty weights, involving other criteria may likewise be used.

In the simplest case, penalties are assigned in a pairwise fashion, penalizing pairs of widths that are not multiples of each other. This penalty can in the simplest case be a binary penalty, such as a "0" if the two widths are multiples of each other, and "1" otherwise. However, the penalty may be a continuous function of the degree of mismatch, where the degree of the mismatch can for example be mathematically expressed by the result of the modulo operation applied to the widths, i.e. the remainder of the Euclidean division. In more sophisticated embodiments, the penalty may be calculated on sets of more than two widths, in particular three, four, or five different widths, and penalties are introduced if the set comprises widths that are mismatched. This strategy is more complex, but allows for penalizing potential sources of fragmentation not covered in a pairwise approach. Again, the penalty may be a binary penalty or some linear or nonlinear function of the result of the modulo operation.

In some embodiments, it is also possible to implement a penalty system associated with a desired granularity A, for example A=25 GHz. For instance, all MCh widths that are mismatched with a n×A GHz grid (with n an integer) may be penalized in proportion to the deviation from A GHz or its multiples. This "deviation" can again be expressed as the "width modulo A". In this case, however, the desired granularity A must be given as an input to the width adjustment module. The resulting MCh width set will be aligned with an A GHz grid (i.e., tend to feature multiples of A GHz), except in cases where the spectral benefit of using a "mismatched" width is very substantial.

Moreover, said penalty weights are preferably augmented by an estimated traffic volume associated with each MCh width. That is to say, in the optimization, among the MCh widths particularly prone to lead to fragmentation problems, it is preferable to penalize particularly those MCh widths that are expected to carry a high share of the estimated traffic volume, or in other words, are "popular MCh widths" in the expected operation of the network, because they would have the largest bearing on the fragmentation and should therefore be predominantly considered in the optimization.

In a preferred embodiment, said optimization algorithm assigns penalty weights to original MCh widths that are mapped to higher MCh widths in the reduced set of MCh widths, wherein said penalty weights represent an estimate of the relative, network-wide spectral loss caused by the mapping. Again, the relevance of the mapping of a MCh width with respect to the spectral loss will depend on how high the expected use of this MCh width in the network actually is, because only MChs that will actually be employed in large number and/or on many paths do have a more severe impact on the overall, i.e. network-wise spectral loss.

In some embodiments, said step of computing said first set of MCh widths is carried out in an off-line planning stage of said network.

In addition or alternatively, said method may be carried out by a network management system, in particular by an SDN controller, which receives a network topology and a set of line rates to support, and based thereon calculates said first set of MCh widths. Note that for calculating the first set of MCh widths, generally no further input than the network topology and the list of line rates to be supported is needed. However, the network management system may further calculate an expected traffic volume information per MCh width profile. For example, the network management system can receive traffic forecast or traffic history information to calculate more accurate volume information per MCh width. In some embodiments, in absence of such information, it can simply be assumed that all line rates and node pairs are equally likely. In this way, at least the topology of the optical network may be accounted for in defining the set of usable MCh widths. In addition, said network management system may further carry out service provisioning using said reduced set of MCh widths.

In a related embodiment, said network management system further receives traffic forecast data regarding the amount of traffic per node pair or line rate for use in the calculation of the expected traffic volume information per MCh width profile. This way, the relative importance of each MCh width in the overall network can be better assessed, such that the reduction procedure is more aware of the potential efficiency loss associated with mapping any given MCh width to a higher value.

In addition or alternatively, said management system further monitors information regarding a fragmentation level measured in the network as a result of service provisioning using said reduced set of MCh channels, and based on said fragmentation level information, updates said threshold value defining a maximum decrease in spectral efficiency. For example, if it turns out that the fragmentation level is very high, this could be an indication to increase the threshold value defining a maximum decrease in spectral efficiency of the reduced set of MCh widths, and vice versa.

In addition or alternatively, said management system further monitors information regarding optical performance of provisioned channels, and in case of determining insufficient optical performance on a given MCh, recalculates the reduced set of MCh widths under the additional constraint that the MCh width of said given MCh is enlarged. This is for example important if the optical performance of a specific MCh format has been overestimated, i.e. that for example larger guard bands or an additional carrier within the MCh is needed, which would both require a larger spectral width for the MCh. In this case, feedback from the monitoring indicates to the width adjustment module that the present width associated with the MCh should be preferentially or forcefully enlarged, and the whole set of MCh widths is re-calculated based on this constraint.

A further aspect of the invention relates to a management system, in particular an SDN controller, comprising:

an input for receiving topology information of an optical network, a module for computing, based on a topology of the network, a first set of MCh widths for tentative use in said optical network, said first set of MCh width defining a target spectral efficiency, and a MCh width adjustment module for generating a reduced set of MCh widths from said first set of MCh widths by mapping each of the original MCh widths of said first set to a corresponding new MCh width, which is identical with or larger than the original MCh width, thereby decreasing the spectral efficiency as compared to said target spectral efficiency, wherein a plurality of different original MCh widths of said first set of MCh widths are mapped to the same new MCh width to thereby decrease the number of MCh widths in the reduced set of MCh widths, wherein said mapping is carried out automatically by said adjustment module (18) employing an optimization algorithm that penalizes combinations of MCh widths that are more likely to cause fragmentation problems in the spectrum as compared to MCh widths that are less likely to cause fragmentation problems, and penalizes a decrease in spectral width as compared to the target spectral efficiency due to the mapping of an original MCh width of said first set to a new, larger width.

The management system may be further configured to carry out a method according to one or more of the embodiments described above.

A further aspect of the invention relates to an off-line planning tool, configured for carrying out a method according to one or more of the embodiments described above.

SHORT DESCRIPTION OF THE FIGURES

Figure 3:
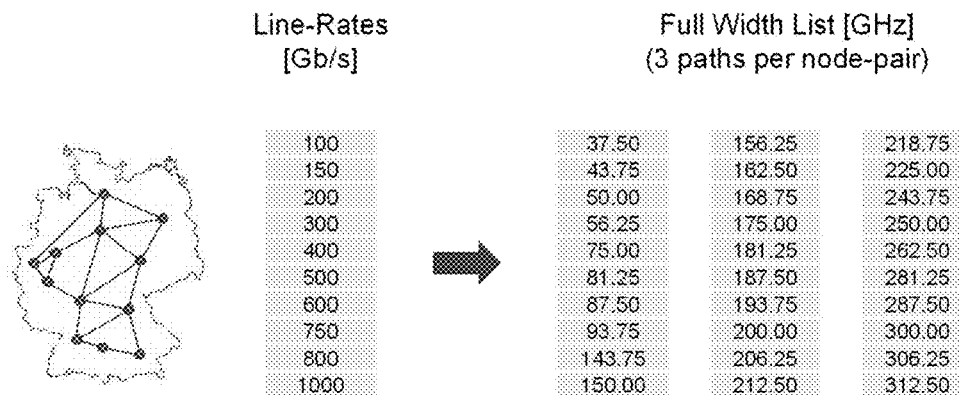

FIG. 3 schematically shows an exemplary network, as well as the optimum MCh widths obtained for the three most favorable paths for a given node pair.

Figure 2:
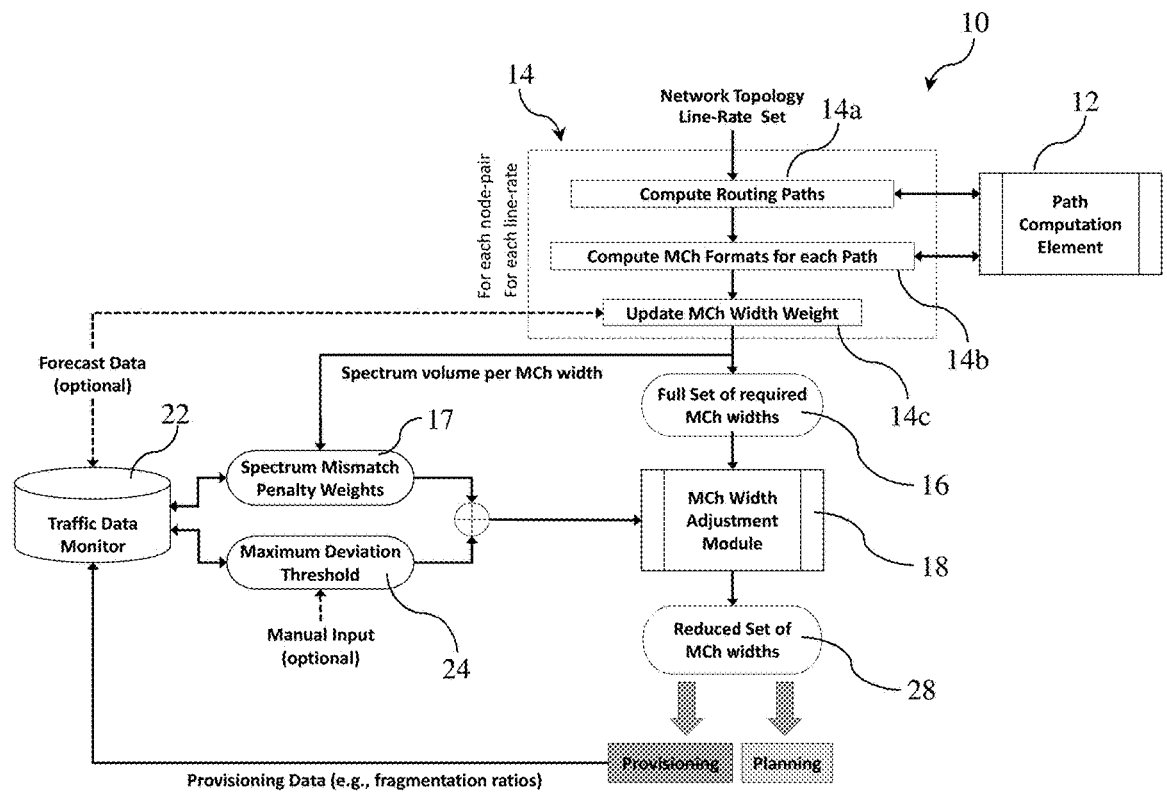
FIG. 2 is a flow diagram illustrating the method of the invention and the components involved in caring it out.
Figure 4:
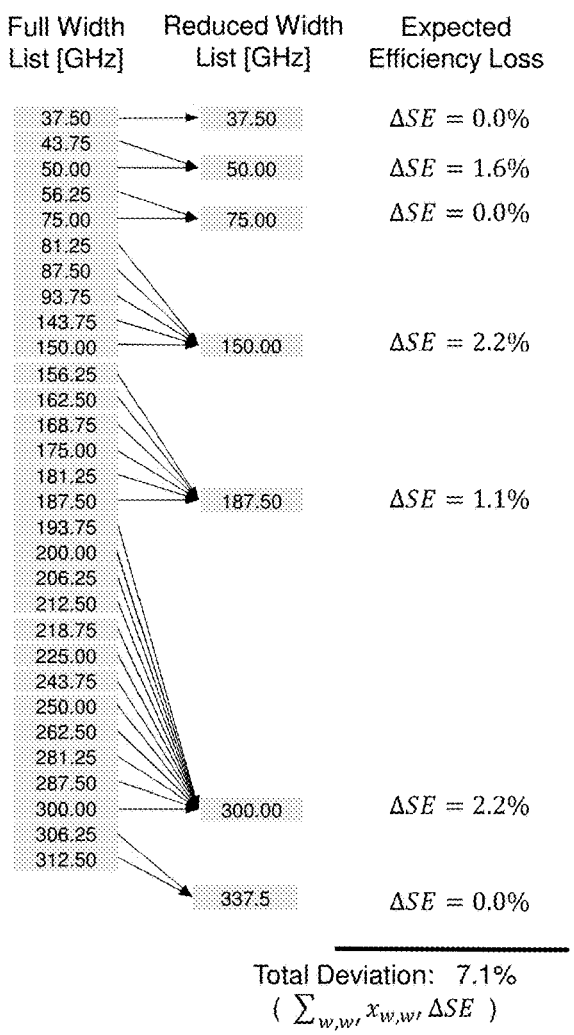

FIG. 4 summarizes a sample mapping of a first set of MCh widths to a reduced set of MCh widths as carried out by a MCh width adjustment module shown in FIG. 2.

Figure 5:
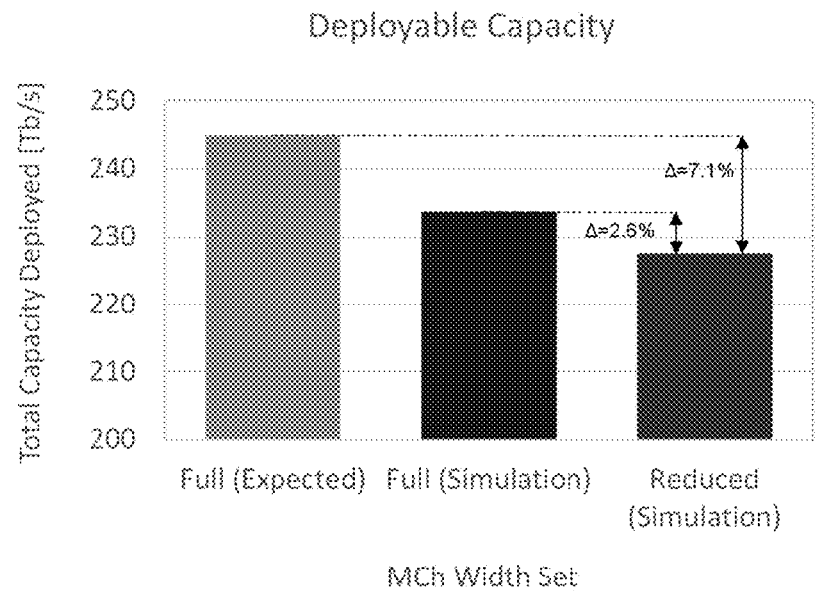

FIG. 5 is a diagram comparing the expected and actual deployed capacity of a full (first) set of MCh profiles with width profiles according to a reduced set of MCh widths.

FIG. 6 to 11 schematic diagrams illustrating various use cases of the method of the invention.

Figures 12, 13:
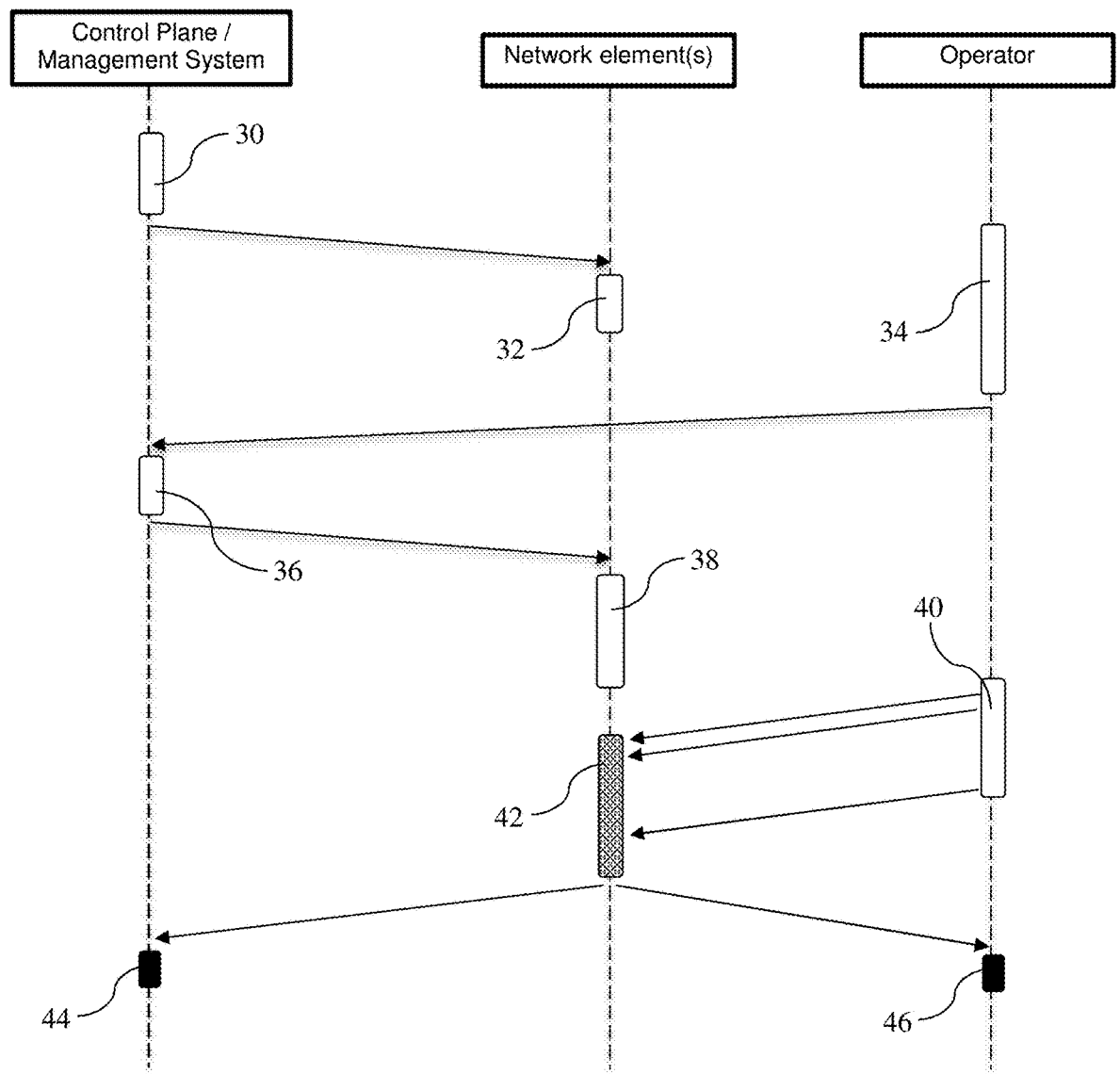

FIG. 12 a representation of a text file that may be communicated from the network management system to an individual NE.

FIG. 13 a flow diagram illustrating communication between the network management system, an individual network element and an operator.

DESCRIPTION OF THE PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

Figure 1:
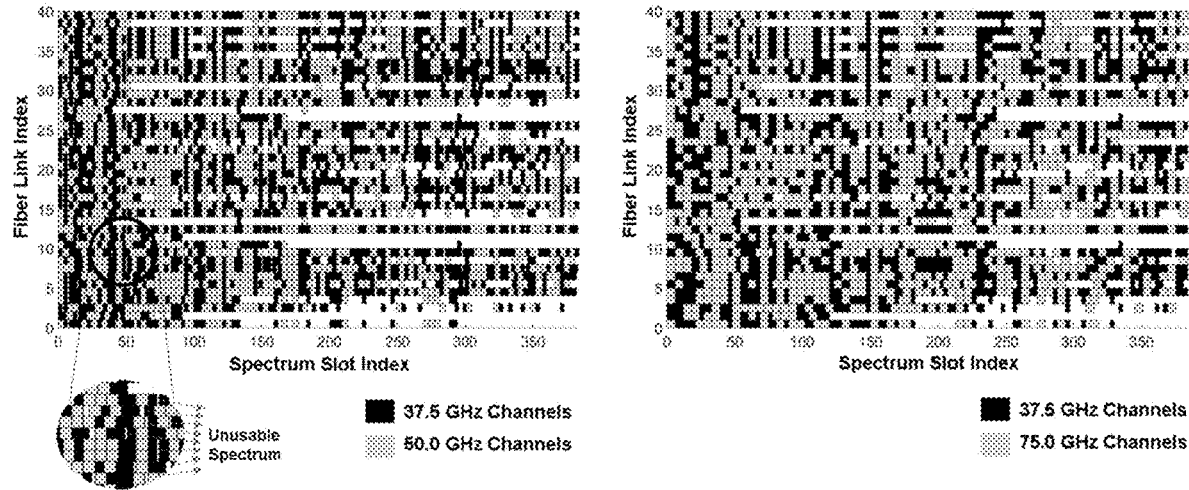
FIG. 1 shows two spectral allocation maps for the same network and traffic profile for matching and non-matching frequencies.

For illustration purposes, FIG. 1 shows two spectral allocation maps for the same network and traffic profile where in the first case (left part of FIG. 1), channel formats with 37.5 and 50 GHz widths were deployed, while in the second case (right part of FIG. 1), the available channel widths are 37.5 and 75 GHz. The most desirable set in terms of spectral efficiency is naturally the case with 37.5 and 50 GHz channels. However, since these formats are not "matched", their assignment in the network causes portions of the spectrum to become stranded and renders them unusable.

In the case with 37.5 and 75 GHz formats, the channel widths are "matched" in that one is an integer multiple of the other. As is seen from the right part of the figure, this has the effect that the existing widths fit each other such that any spectral windows left can always be reused by at least the smallest format available. Thus, although the initial spectral efficiency of this format set is lower than with 37.5 and 50 GHz, its relative immunity to fragmentation effects can in practice make up for this apparent inferior spectral efficiency. This observation is exploited in embodiments of the invention, as set forth below.

A preferred embodiment of the invention is described in greater detail with reference to FIG. 2 and FIG. 3. FIG. 2 is a flow diagram illustrating the method of the invention and the components involved in carrying it out. In FIG. 2, a network management system 10 is shown, comprising a path computation element (PCE) 12 and a module 14 for computing a first set of MCh widths for tentative use in an optical network. The module 14 receives information regarding the topology of the network as well as a set of line rates to be supported by the optical network. An example of an optical network is schematically shown in the left part of FIG. 3. FIG. 3 also displays an exemplary list of line rates to be supported by the network, which in the given example amounts to 100, 150, 200, 300, 400, 500, 600, 750, 800, and 1000 Gb/s.

Based on the topology of the network, for each pair of nodes within the network, and for each of the line rates, the module 14 computes a predetermined number (3 in the shown embodiment) of paths connecting said nodes, using the PCE 12, indicated by step 14*a* carried out by module 14 in FIG. 2. Moreover, for each path and each line rate, a preferred MCh format (MCh width, number of carriers within the MCh, modulation format and symbol rate for each of the carriers, FEC overhead) is calculated, according to some desired criteria (step 14*b*). In preferred embodiments, the desired criterion is an efficiency optimization criterion, for example a criterion according to which the highest possible spectral efficiency is achieved without having to provide for additional 3R regeneration. Since the method makes use of the high degrees of freedom in the choice of available MCh formats, very high spectral efficiencies can be achieved. The spectral efficiency conveyed by the choice of "best" MCh formats for the entire network is referred to as the "target spectral efficiency" herein, as this resembles the spectral efficiency that can at least theoretically be obtained by preferred choices of MCh formats.

The right part of FIG. 3 shows the results for one exemplary node pair of the network: For each of the line rates under consideration, and for each of the three best ranked routing paths determined in step 14*a*, a corresponding optimum MCh format is computed. While the MCh format is defined by a MCh width in combination with a number of carriers, modulation format, symbol rate and FEC overhead, of these MCh formats, in FIG. 3 only the corresponding MCh widths are displayed.

Each time a MCh width is computed that has not been used for any other path or line rate before, this MCh width is added to a list (see step 14*c*, according to which a present list is updated with the newly computed MCh weight). The result of steps 14*a* to 14*c*, when carried out for each node pair and for each line rate, is a list of MCh widths that may potentially be deployed in the network, comprising the unique MCh width values required by all original MCh formats outputted in the previous stage. The content of this list resembles the "first set of MCh widths for tentative use in the optical network" referred to above, which is represented under reference sign 16 in FIG. 2. Herein, the expression "tentative use" indicates that these MCh widths could indeed be used in the network, but in the framework of the method of the invention, only a reduced set of MCh formats with corresponding widths generated therefrom will actually be employed, as explained in the following.

Additionally, when a MCh format with a given width w is found to be the "best" for a path/line-rate, the expected volume of traffic associated with that path/line-rate is added to the overall estimated volume for MCHs with width w. In the shown embodiment, the "expected volume" is estimated dependent on

- a node pair/line rate likelihood: the amount of spectrum assigned to a given path/line rate combination is proportional to the likelihood of the traffic expected/measured between the node pair served by the path, and to the likelihood of each line rate being deployed, depending on for example on client history or measurements.
- The rank of the path: for the same node pair, higher ranked paths, such as shortest paths, are more likely to be used than lower ranked ones.

The volume estimates for each MCh width hence indicate how much spectrum, in relative terms, the management system 10 will likely assign overall to MCHs width profiles of any given width. Based on this information, it is possible to define a target spectral efficiency corresponding to always using the most efficient MCh profile available.

The combined expected traffic information for each MCh width provides the weights that may be used to calibrate the penalties associated with each set of active widths in the network, as described in more detail below. The rationale behind this is that widths that are more prevalent in the network are more relevant for assessing fragmentation and vice-versa. The calibration of the penalty weights is carried out by a module 17 shown in FIG. 2, which receives the information regarding the spectrum volume per MCh width.

When the full list of possible MCh widths ("first set of MCh widths") is obtained, the method will attempt to reduce this list by mapping some of the MCh widths to larger values (e.g., increasing the width of all MCHs with an original width of 112.5 GHz to 125 GHz of spectrum), to thereby generate a reduced set of MCh widths. The computation of this reduced list is carried out by a width adjustment module 18 and must manage two conflicting requirements: (1) The spectral mismatch between the widths should be as small as possible, and (2) the spectral inefficiency introduced by not always using the "best" format shall not exceed a predefined threshold.

In order to achieve the first objective, the method defines a penalty weight associated to a set of widths (preferably a pair of widths, but possibly a higher order set), based on the spectral mismatch between those widths, that is used in an optimization algorithm carried out by the MCh width adjustment module. In other words, this penalty weight penalizes combinations of MCh widths that are more likely to cause fragmentation problems in the spectrum as compared to MCh widths with matching frequencies. In one embodiment, the penalty between two widths may be assigned a value zero if those widths are multiple/sub-multiples (divisor) of each other, and a value greater than zero otherwise. However, more sophisticated penalties for suppressing combinations of MCh widths prone to fragmentation are likewise possible. Furthermore, the significance of these weights can be augmented by the traffic volume estimate associated with each width, such that the mismatch between more prevalent MCh widths is given higher importance. As seen in FIG. 2, information regarding traffic volume estimates can be provided to the module 17 from a traffic data monitoring database 22.

The second requirement sets a hard limitation on the deviation from the originally expected spectral efficiency (given by always using the most efficient format) that the width reduction procedure may result in. This "maximum deviation threshold value" is provided to the MCh width adjustment module 18 from a maximum deviation threshold module 24. As indicated in FIG. 2, the maximum deviation threshold value may be manually set by the network operator, or may be tied to the real-time data-monitoring database 22, which measures how much fragmentation (e.g., stranded bandwidth) the current deployment of demands in the network is producing. Based on this measurement data, the management system 10 may decide to set a more aggressive threshold if the current width set is resulting in fragmentation levels above expected. Conversely, if the management system 10 or a corresponding controller thereof measures low levels of fragmentation in the spectrum, it may gradually decrease the deviation threshold to try and improve the overall expected spectral efficiency. For this purpose, the optimization algorithm used by the MCh width adjustment module 18 penalizes a decrease in spectral width as compared to the target spectral efficiency due to the mapping of an original MCh width of said first set to a new larger width. Herein, the optimization algorithm accounts for the expected relevance of the MCh width, or in other words, the expected data volume in all of the MCHs having said with. This means that MCh widths that are very likely to be employed on the actual operation of the network shall preferably not to be mapped, or only mapped to a slightly higher values, because that would involve a comparatively higher decrease in spectral efficiency as compared to a similar increase of MCh widths of channels that are less likely to be used.

In the case of offline network planning, the workflow described thus far is executed a single time without feedback, and the network is planned using the set of MCh widths in the reduced set, represented at reference sign 20 in FIG. 2. When the method is however part of an overall management system overseeing online network operation and service provisioning, resulting spectrum management data may be provided to the monitoring database 22, such that the reduced width set can be recalculated should the network parameters be above or below expected. These parameters may include fragmentation levels, optical performance data, and/or traffic volume per path/line-rate information.

The MCh width adjustment module 18 performs the reduction procedure by receiving as input the original, "first" MCh set from module 16, the fixed maximum deviation threshold from module 24, and the calibrated weights of traffic volume per MCh width from either module 16 or 17, which indicate how relevant a set of MCh formats is towards inducing fragmentation. In the exemplary embodiment shown, the MCh width adjustment module 18 carries out an optimization algorithm which carries out a MCh width mapping while minimizing the following expression:

$$\min \sum_{w,w'} (x_{w,w'} \; \Delta SE_{w,w'}) + \varepsilon \sum_{W} p_W \sum_{w \in W} l_w$$

Herein, $x_{w,w'}$ indicates if MCh width w of said first set of MCh widths is mapped to MCh width w' (where w'≥w). Herein, $x_{w,w'}$ is 1 in case the mapping is made and 0 if it is not made.

Parameter $\Delta SE_{w,w'}$ indicates the relative expected loss (network-wide) in spectral efficiency resulting from mapping MCh width w to w'. The first part of the above expression involving the parameter $\Delta SE_{w,w'}$ hence resembles a penalty weight assigned to all original MCh widths that are mapped to a higher MCh width in the reduced set of MCh widths, that represents an estimate of the relative, network-wide spectral loss caused by the mapping.

Parameter ε is a weighting factor balancing the importance of minimizing fragmentation vs. the overall spectrum efficiency. This weighting factor ε is a specific example of the general concept of a "weighting parameter" referred to in the summary of the invention. Parameter $p_W$ is a fragmentation penalty introduced if all the widths (two or more) in set W are active, and $l_w$ is a spectrum consumption volume associated with width w. $p_W$ is a penalty associated with a group of widths. The sum refers to all groups W, where in the simplest case, W could be a pair of possible MCh widths. For example, if one group W is (25, 37.5 GHz), $p_W$ is equal to some penalty factor if both 25 and 37.5 GHz are active MCh widths in the reduced set, and zero otherwise. The penalty itself depends on the mismatch between the widths. In the simplest form, the penalty may be 1 if the widths are not multiples of each other (simply counting the number of mismatched pairs), and zero otherwise. In this way, every mismatched width pair is penalized (weighted by ε and by $l_w$), which gives the total traffic volume associated with the mismatched active widths.

However, the penalty $p_W$ need not to be a binary function, but could be any type of function, in particular a linear function of the degree of mismatch between the widths in the group of widths W. As was explained in the summary of the invention, the degree of the mismatch can for example be mathematically expressed by the result of the modulo operation applied to the widths, i.e. the remainder of the Euclidean division. This way, severe and less severe mismatches with regard to fragmentation problems can be distinguished and accounted for.

Moreover, the group of widths W may include more than two widths, in particular three, four, or five different widths, and the penalty $p_W$ could be nonzero if this set comprises any widths that are mismatched. Again, the penalty can be of binary nature or a continuous function, in particular a linear function, of the degree of mismatch between widths within the set. This strategy is more complex, but allows for penalizing potential sources of fragmentation not covered in a pairwise approach. It is important to note that there are countless ways of defining penalties pwthat penalize combinations of MCh widths that are more likely to cause fragmentation problems, and the invention is not limited to any specific one of them, as any of them will allow to steer the reduced set of MCh channels towards a selection of MCh channels that is less prone to fragmentation.

As was also explained in the summary of the invention, is possible to implement a penalty system associated with a desired granularity A. For instance, all MCh widths that are mismatched with a n×A GHz grid (with n an integer) may be penalized in proportion to the deviation from A GHz or its multiples. This "deviation" can again be expressed as the "width modulo A". In this case, the desired granularity A would be given as an input to the width adjustment module. The resulting MCh width set will be aligned with an A GHz grid (i.e., tend to feature multiples of A GHz), except in cases where the spectral benefit of using a "mismatched" width is very substantial.

Further, the aforementioned maximum deviation threshold T is introduced as a hard constraint in the general form:

$$\sum_{w,w'} (x_{w,w'} \Delta SE_{w,w'}) \leq T$$

The threshold value T hence defines a maximum decrease in spectral efficiency of the reduced set of MCh widths as compared to said first set of MCh widths. In other words, while the weighting factor ε balances the importance of minimizing fragmentation versus the overall spectrum efficiency in a soft decision type manner, the maximum-deviation threshold T provides a hard-decision mode, where T is used as a limiting constraint on the amount of extra spectrum used.

As the skilled person will appreciate, the weighting factor ε and the threshold value T defining the maximum decrease in spectral efficiency of the reduced set of MCh width as compared to said first set of MCh widths are closely related, and in some embodiments, they may be represented by the same parameter if appropriately defined.

Employing an optimization algorithm minimizing the above mathematical expression, for example a gradient descent optimization algorithm or the like, the MCh width adjustment module 18 thus produces a result that:
- minimizes the weighted combination of the expected spectral efficiency and the fragmentation penalties induced by combinations of active MCh widths,
- maintains the deviation from the target spectrum consumption of the first (original) set of MCh widths (without accounting for the gain in spectral efficiency due to decrease in fragmentation) below the specified threshold T, and
- always maintains or improves optical performance calculated in the original set of MCh formats, as the MChs in the reduced set will have the same or higher guardbands than in the original configuration.

As the skilled person will appreciate, the penalty of non-matching MCh widths will automatically lead to a decrease of MCh widths in the new, "reduced set". By increasing the weighting factor ε, the number of MCh widths remaining in the reduced set will typically decrease. Note that in various embodiments, however, the optimization algorithm may be in addition or alternatively be constrained by a threshold value defining a maximum number of MCh widths in the reduced set. This way, the absolute number of MCh widths remaining in the reduced set can be set as a hard constraint, thereby ensuring a desired decrease in provisioning complexity associated with a smaller number of MCh widths. The maximum number of MCh widths remaining in the reduced set can e.g. be manually set by a network operator.

In the network example of FIG. 3, one embodiment of MCh width adjustment module 18 produced the reduced MCh set mapping shown in FIG. 4, with a T value of 8%. The mapping reduces the set of MCh profiles from 30 to 7, with a total deviation from the original spectral efficiency value below the required 8%. Note that the new widths resulting from the process do not need to be included in the first, original set (e.g., the 337.5 GHz value was not present in the full width list). Also, note that the ΔSE value for mapping widths 56.25 and 75 GHz to 75 GHz is zero, indicating no loss in efficiency. This occurs because the amount/importance of the MChs originally mapped to 56.25 GHz is very small compared to the entirety of the MCh widths.

In the particular embodiment of this example, the gap between the spectral efficiency of the original and reduced MCh width sets (without accounting for fragmentation) would be 7.1%. However, because the set is not only reduced, but also tentatively aligned to minimize spectral mismatches between different MCh widths, the difference in spectral efficiency between the two sets (and consequently the actual deployable capacity in the network) will be smaller. In actual network conditions, the fragmentation effect causes the achievable capacity to be smaller than expected when looking only at the average spectral efficiency of the formats. However, as it is shown in FIG. 5, this reduction is more pronounced for the full (i.e. first) MCh width set, than for the reduced set, as the latter is assembled with minimizing fragmentation in mind. Ultimately, the simulation results in FIG. 5 show that the 7.1% spectral efficiency (and capacity) difference expected between the width sets is actually reduced to 2.6% in actual network conditions, while the number of different MCh width profiles in the network was reduced to less than a third of the full set. The task of a provisioning tool or manual planner is therefore greatly facilitated, while the resulting efficiency is only marginally affected. Furthermore, if an online provisioning tool such as an SDN controller monitored and measured the efficiency drop against the full set and still deemed it too high, it could trigger a reevaluation of the MCh width set with a less aggressive deviation threshold provided by module 24, in order to attempt to increase efficiency at the risk of increasing fragmentation levels.

The scope of the invention fits in the context of a method within a network management system 10 (e.g., SDN controller) that triggers the MCh width adjustment, monitors network performance and may re-balance the set according to such performance parameters. Additionally, it can also be envisioned in the context of a one-off planning (e.g., in an offline planning tool) where the reduced MCh set is calculated one time with a fixed set of input parameters. Several use-cases (and respective advantages) of this method are briefly summarized with reference to FIGS. 6 to 11 below.

Figure 6:
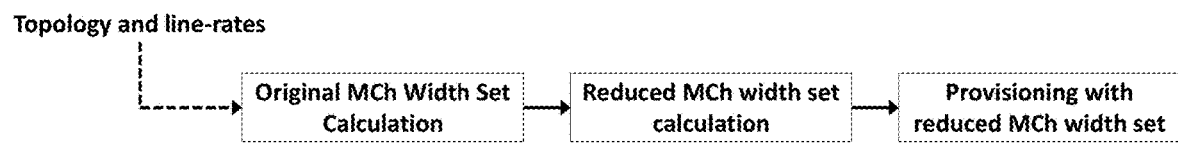

FIG. 6 schematically shows a situation in which the management system 10 encompassing this method receives a network topology and a set of line-rates to support based on which it calculates the original (i.e. first) MCh width set and expected traffic volume information per width profile. The management system 10 triggers the MCh width set reduction procedure. Provisioning of new services complies with the new, i.e. reduced set of MCh widths computed by the system.

Figure 7:
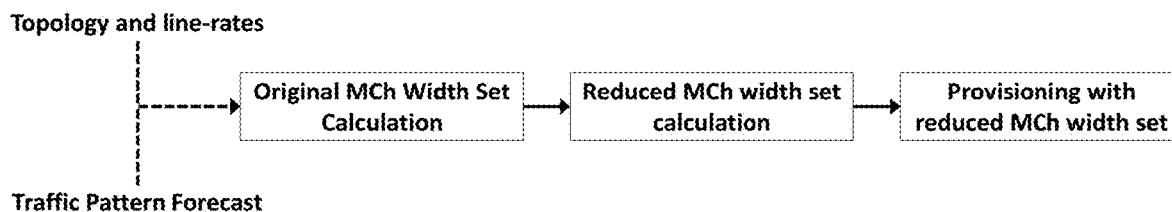

FIG. 7 schematically shows a situation in which the management system 10 again receives a network topology and set of line-rates, and calculates the original (i.e. first) MCh width set. The expected traffic volume per width profile is in this case however further augmented by forecast data retrieved from the traffic data monitoring database 22 (see FIG. 2) regarding the amount of traffic per node-pair or line-rate, in order to balance the relative importance of each MCh width in the overall network. In this way, the reduction procedure is more aware of the potential efficiency loss associated with mapping each width profile to a higher value.

Figure 8:
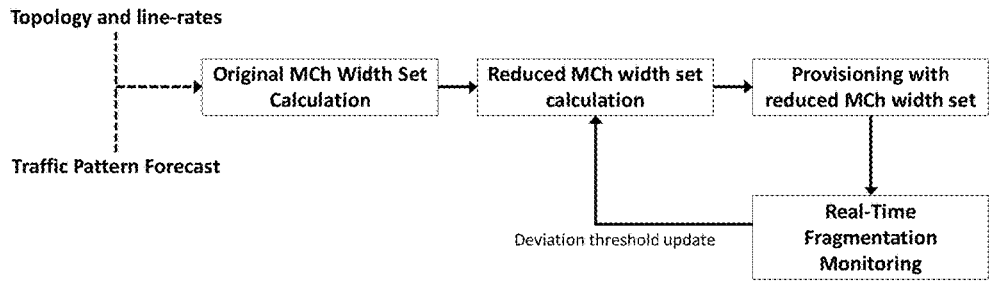

FIG. 8 schematically shows a situation in which the management system 10 calculates the reduced MCh width set, uses it for provisioning of new services in the network, and further monitors and compiles information regarding the fragmentation level measured in the network as a result of provisioning with the reduced width set. As seen from FIG. 2, this information is likewise retrieved from the traffic data monitoring database 22 and is used by the modules 24 of the management system 10 to re-tune the reduced MCh width set by setting a more aggressive or conservative threshold T of the deviation of the spectral efficiency (disregarding fragmentation) from the original (i.e. first) MCh width set.

Figure 9:
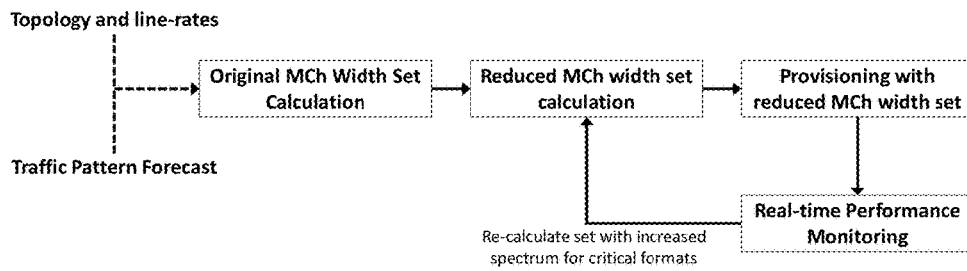

In the situation schematically shown in FIG. 9, the monitoring of the provisioning under the reduced set of MCh widths includes information about the optical performance of the provisioned channels, which according to FIG. 2 is likewise retrieved from the traffic data monitoring database 22 and may be used by module 24 to force a more aggressive deviation threshold T in the re-calculation of a MCh width set (see FIG. 2 at reference sign 24). This can be applied for instance if the optical performance of a specific MCh format is overestimated and its actual margins are below the expected. In this case, the feedback from the monitoring service (such as database 22) indicates to the MCh width adjustment module 18 that the width associated with that format should be preferentially/forcefully enlarged and the whole width set is re-calculated based on this constraint.

Figure 10:
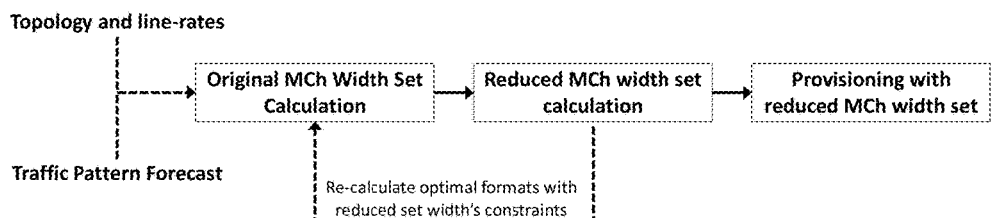

In the situation schematically shown in FIG. 10, the calculation of the reduced MCh width set is itself redirected to the original MCh format calculation (before handing over a width set for service provisioning/planning). In this instance, the method assumes an iterative approach. A reduced MCh width set is calculated in order to minimize fragmentation. The original MCh formats may then be re-calculated with the constraints imposed by the reduction procedure (e.g., the original MCh parameters computed without spectral restrictions may differ from the ones obtained when a higher width is imposed externally). This workflow can be used to ensure that, for a width specified by the reduction procedure, the chosen MCh format always provides the best optical margins.

Figure 11:
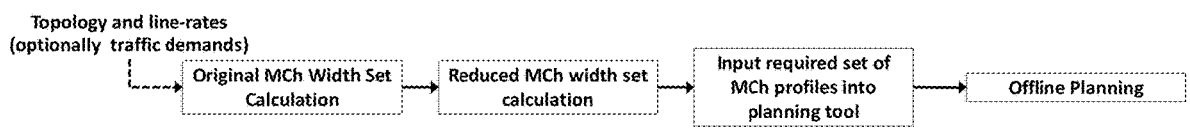

In the context of an offline planning tool (such as to the applicants TransNet tool), a human planner may be forced to manually define the type of MChs the system is allowed to use (in order to limit the amount of brute-force optical performance calculation). In this instance, as shown in FIG. 11, the planner would benefit from the use of this method to automate the pruning of the set of required MCh formats, with the added benefit that the width set used is adjusted to reduce the effect of fragmentation. Note that this automated calculation may be augmented with traffic specific information (e.g. a list of demands), but in general requires only information about the network topology and line-rates to be supported.

As has become apparent from the above disclosure of the invention and description of preferred embodiments, the method has a number of significant advantages over the prior art, some of which reemphasized in the following:

The method of the invention scales with the number of possible width combinations in the network, independently of the number of slots in each link. Simulations conducted for the method's proof-of-concept show that it can produce results quickly even for original width sets comprising hundreds of entries.

The method is agnostic to any particular spectrum assignment method, as it is only concerned with the set of widths to be used.

The definition of a threshold value T allows the system to tune the expected deviation from the targeted spectral efficiency (and eventually manage and correct it in online operation given network monitoring data).

The penalty weights can be adjusted to historical/forecast data (see FIG. 2) in order to predict if a particular MCh width (or set of widths) is relevant in the overall traffic volume of the network and is thus likely to produce fragmentation issues.

In the embodiments described above, the reduced set of MChs was created and managed by a network management system, fed with information from a planning tool and/or real data from the network. However, as the skilled person will appreciate, network elements (NE) can be manually configured by a network operator using suitable terminals, such as control line interfaces (CLI) or or so-called local craft terminals (LCT). In view of this, the question arises how the consistent planning as described above is maintained when a new channel is turned on "manually" by direct communication with the network element rather than via the management system or control plane.

One way to account for this is by describing the MCh width set in a specific formant and communicating it from the network management system to individual NEs. For example, FIG. 12 shows a simple representation of a text file that may be communicated from the network management system to an individual NE via a corresponding link. In the text file of FIG. 12, the first line is a header specifying the ID of the respective NE. The content of the file includes direction IDs and a corresponding MCh width sets. Herein, the "directions" are the different directions for data traffic provided at the NE, such as North, East, West, South or the like. For each of these directions, a set of MCh widths is specified. By receiving and processing this text file, the NE becomes aware of the MCh width set plans per direction. Since the set was created by the management system considering the complete network, the individual network element can consider restrictions or recommendations that do not affect the NE directly, and which the NE would therefore usually not be able to identify. As the skilled person will appreciate, the information regarding the MCh width set associated with the respective connections can be communicated by means of commands other than a text file.

In the event of turning on a new channel "manually" via a CLI or LCT terminal, the particular NE will be able to evaluate the turn on requests for consistency with the planning as defined in the text file of FIG. 12. In case of inconsistencies, the NE may raise an alarm to the management system or control plane.

To illustrate this further, FIG. 13 is a flow diagram illustrating possible interaction between a control plane/management system, a network element and a network operator. In step 30, the control plane/network management system determines the reduced set of MCh widths, for a existing or planned network development, including NE and direction specific MCh width sets. This information is communicated, for example by means of a text file as shown in FIG. 12, to the NE. In step 32, the NE processes the received text file, thereby becoming aware of the MCh set recommendation.

In step 34, the operator deploys a new service request via the control plane/management system. In step 36, the control plane/management system processes the request. Since the control plane/management system is aware of the network and the favorable reduced MCh set, it may configure the NE in a way that is consistent with the reduced MCh set. The configuration is carried out in step 38. In step 38, the NE does not validate the configuration against the stored MCh width set, because the configuration is initiated by the control plane/management system.

However, if the NE receives direct commands from the operator via CLI or CLT (step 40), the NE will check in step 42 whether these commands are in agreement with the direction specific MCh width sets it has received and processed in step 32. In case of contradictions, it will raise an alarm that is acknowledged in steps 44 and 46 by the control plane/management system and the operator, respectively. In alternative embodiments, instead of raising an alarm, the manual configuration can be simply rejected, and an alarm is sent only towards the management system, indicating the operation, the terminal and the operators user login. Therefore, the network manager will be immediately informed with regard to operation activities which might jeopardize the network status or future operation.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

The invention claimed is:

1. A method of determining a set of media channel (MCh) widths for an optical network, comprising the steps of:
  based on a topology of the optical network, generating a first set of original MCh widths for tentative use in the optical network, the first set of original MCh widths defining a target spectral efficiency; and
  generating a reduced set of new MCh widths from the first set of original MCh widths by respectively mapping each original MCh width, among the first set of original MCh widths, to a respective new MCh width, among the reduced set of new MCh widths, that corresponds to the mapped original MCh width;
  wherein each new MCh width, among the reduced set of new MCh widths, has a respective width that is at least as large as a respective width of the respective original MCh width that is mapped to the respective new MCh width, wherein at least a plurality of respective original MCh widths of the first set of original MCh widths are mapped to a same respective new MCh width among the reduced set of new MCh widths to thereby decrease a number of new MCh widths in the reduced set of new MCh widths relative to a number of original MCh widths in the first set of original MCh widths, thereby generating a decreased spectral efficiency as compared to the target spectral efficiency;
  wherein the mapping of the respective original MCh widths to the respective reduced set of new MCh widths is carried out automatically using a width adjustment module employing an optimization algorithm that:
    penalizes a contemplated combination, in a contemplated new MCh width, of a plurality of original MCh widths, among the first set of original MCh widths, that is more likely to cause fragmentation problems in a resulting spectrum as compared to a contemplated alternative combination, in a contemplated new MCh width, of another plurality of original MCh widths among the first set of original MCh widths; and
    penalizes a decrease in spectral width, as compared to the target spectral efficiency, due to a contemplated mapping of an original MCh width among the first set of original MCh widths to a contemplated new MCh width that is larger in width than a width of the original MCh width with respect to which the mapping is contemplated.

2. The method of claim 1, wherein the step of generating the first set of original MCh widths is accomplished at least in part by at least one of computing and estimating, and comprises generating an expected relevance of each original MCh width of the first set of original MCh widths in actual data transmission carried out on the optical network, and wherein the optimization algorithm accounts for the expected relevance in the penalizing of the decrease in spectral width due to a contemplated mapping of an original MCh width among the first set of original MCh widths to a contemplated new MCh width that is larger in width than a width of the original MCh width with respect to which the mapping is contemplated.

3. The method of claim 1, wherein the step of generating the first set of original MCh widths comprises the steps of:
   computing, for at least a plurality of node pairs within the network, a predefined number of paths; and
   determining, for each of the paths, and for each of a predetermined number of line rates to be employed on each respective path among the paths, a MCh format that best fulfills a spectral efficiency optimization criterion, wherein the MCh format comprises a MCh width and at least one of a modulation format, a number of carriers within an associated media channel, a spectral location of carriers within an associated media channel, a symbol rate, and a FEC overhead.

4. The method of claim 3, wherein the spectral efficiency optimization criterion is a criterion of obtaining a highest possible spectral efficiency without having to provide for additional 3R regeneration.

5. The method of claim 3, wherein the predefined number of paths computed for each node pair is at least two, and wherein the predetermined number of line rates to be employed on each respective path among the paths is at least three.

6. The method of claim 3, wherein a relevance of each MCh width in the first set of MCh widths is generated based on a likelihood that at least one of:
   a path employing the MCh width is chosen;
   on the path a line rate is required for which the MCh width fulfills the spectral efficiency optimization criterion;
   wherein the relevance of each MCh width is accomplished at least in part by at least one of computing and estimating.

7. The method of claim 1, wherein the number of original MCh widths in the first set is at least twice as high as the number of new MCh widths in the reduced set of new MCh widths.

8. The method of claim 1, wherein the optimization algorithm is constrained by a threshold value defining a maximum decrease in spectral efficiency of the reduced set of new MCh widths as compared to the first set of original MCh widths.

9. The method of claim 1, wherein the optimization algorithm is constrained by a threshold value defining a maximum number of new MCh widths in the reduced set of new MCh widths.

10. The method of claim 1, wherein the optimization algorithm comprises a weighting parameter which balances an importance of minimizing fragmentation versus an overall spectrum efficiency.

11. The method of claim 1, wherein the reduced set of new MCh widths is generated by iterative computation, wherein in at least one iteration of the iterative computation, a reduced set of new MCh widths obtained in a previous computation of the iterative computation is used as the first set of original MCh widths.

12. The method of claim 1, wherein the optimization algorithm assigns penalty weights to subsets.

13. The method of claim 1, wherein the optimization algorithm assigns penalty weights to original MCh widths that are mapped to higher MCh widths in the reduced set of new MCh widths, wherein the penalty weights represent an estimate of the relative, network-wide spectral loss caused by the mapping to higher MCh widths in the reduced set of new MCh widths.

14. The method of claim 1, wherein the step of generating the first set of original MCh widths is carried out in an off-line planning stage of the network.

15. The method of claim 1, wherein the method is carried out by a network management system, which receives a network topology and a set of line rates to support, and based thereon calculates the first set of original MCh widths, wherein the network management system further carries out service provisioning using the reduced set of new MCh widths.

16. The method of claim 15, wherein the network management system further receives traffic forecast data regarding an amount of traffic per node pair or line rate for use in a calculation of an expected traffic volume information per MCh width profile.

17. The method of claim 15, wherein the method is carried out by a network management system and wherein the network management system further monitors information regarding a fragmentation level measured in the optical network as a result of service provisioning using the reduced set of new MCh channels, and based on the fragmentation level information, updates a threshold value defining a maximum decrease in spectral efficiency.

18. The method of claim 17, wherein the management system further monitors information regarding optical performance of provisioned channels in the optical network and, in a circumstance when it is determined that there exists an insufficient optical performance on a given media channel, recalculates a reduced set of new MCh widths under an additional constraint that a recalculated new MCh width of the given media channel is enlarged relative to a former new MCh width of the given media channel.

19. A SDN controller, comprising:
   an input for receiving topology information relating to an optical network;
   a module for generating, based on a topology of the optical network, a first set of original MCh widths for tentative use in the optical network, the first set of original MCh widths defining a target spectral efficiency; and
   a MCh width adjustment module for generating a reduced set of new MCh widths from the first set of original MCh widths by respectively mapping each original MCh width, among the first set of original MCh widths, to a respective new MCh width, among the reduced set of new MCh widths, that corresponds to the mapped original MCh width;
   wherein each new MCh width, among the reduced set of new MCh widths, has a respective width that is at least as large as a respective width of the respective original MCh width that is mapped to the respective new MCh width, wherein at least a plurality of respective original MCh widths of the first set of original MCh widths are mapped to a same respective new MCh width among the reduced set of new MCh widths to thereby decrease a number of new MCh widths in the reduced set of new MCh widths relative to a number of original MCh widths in the first set of original MCh widths;

wherein the mapping of the respective original MCh widths to the respective reduced set of new MCh widths is carried out automatically by the width adjustment module employing an optimization algorithm that;

penalizes a contemplated combination, in a contemplated new MCh width, of a plurality of original MCh widths, among the first set of original MCh widths, that is more likely to cause fragmentation problems in a resulting spectrum as compared to a contemplated alternative combination, in a contemplated new MCh width, of another plurality of original MCh widths among the first set of original MCh widths; and penalizes a decrease in spectral efficiency, as compared to the target spectral efficiency, due to a contemplated mapping of an original MCh width among the first set of original MCh widths to a contemplated new MCh width that is larger in width than a width of the original MCh width with respect to which the mapping is contemplated.

20. The SDN controller of claim 19, wherein generating the first set of original MCh widths is accomplished at least in part by at least one of computing and estimating, and comprises generating an expected relevance of each original MCh width of the first set of original MCh widths in actual data transmission carried out on the optical network, and wherein the optimization algorithm accounts for the expected relevance in the penalizing of the decrease in spectral width due to a contemplated mapping of an original MCh width among the first set of original MCh widths to a contemplated new MCh width that is larger in width than a width of the original MCh width with respect to which the mapping is contemplated.

21. The SDN controller of claim 19, wherein generating the first set of MCh widths comprises the steps of:

computing, for at least a part of all pairs of nodes within the network, a predefined number of paths, wherein the path computation is carried out by a path computation element of at least one of a management system and an SDN controller; and determining, for each of the paths, and for each of a predetermined number of line rates to be employed on each respective path among the paths, a MCh format that best fulfills a spectral efficiency optimization criterion, wherein the MCh format comprises a MCh width and at least one of a modulation format, a number of carriers within an associated media channel, a spectral location of carriers within an associated media channel, a symbol rate, and a FEC overhead.

22. The SDN controller of claim 21, wherein the spectral efficiency optimization criterion is a criterion of obtaining a highest possible spectral efficiency without having to provide for additional 3R regeneration.

23. The SDN controller of claim 21, wherein the predefined number of paths computed for each node pair is at least two, and wherein the predetermined number of line rates to be employed on each respective path among the paths is at least three.

24. The SDN controller of claim 21, wherein a relevance of each MCh width in the first set of MCh widths is generated based on a likelihood that at least one of:

a path employing the MCh width is chosen;
on the path a line rate is required for which the MCh width fulfills the spectral efficiency optimization criterion;
wherein the relevance of each MCh width is accomplished at least in part by at least one of computing and estimating.

25. The SDN controller of claim 19, wherein the number of original MCh widths in the first set is at least twice as high as the number of new MCh widths in the reduced set of new MCh widths.

26. The SDN controller of claim 19, wherein the optimization algorithm is constrained by a threshold value defining a maximum decrease in spectral efficiency of the reduced set of new MCh widths as compared to the first set of original MCh widths.

27. The SDN controller of claim 19, wherein the optimization algorithm is constrained by a threshold value defining a maximum number of new MCh widths in the reduced set of new MCh widths.

28. The SDN controller of claim 19, wherein the optimization algorithm comprises a weighting parameter which balances an importance of minimizing fragmentation versus an overall spectrum efficiency.

29. The SDN controller of claim 19, which is configured to generate the reduced set of MCh widths by iterative computation, wherein in at least one iteration of the iterative computation, a reduced set of new MCh widths obtained in a previous computation of the iterative computation is used as the first set of original MCh widths.

30. The SDN controller of claim 19, wherein the optimization algorithm employed by the MCh width adjustment module assigns penalty weights to subsets.

31. The SDN controller of claim 19, wherein the optimization algorithm employed by the MCh width adjustment module assigns penalty weights to original MCh widths that are mapped to higher MCh widths in the reduced set of new MCh widths, wherein the penalty weights represent an estimate of the relative, network-wide spectral loss caused by the mapping to higher MCh widths in the reduced set of new MCh widths.

32. The SDN controller of claim 19, which receives a network topology and a set of line rates to support, and based thereon calculates the first set of original MCh widths, wherein the network management system further carries out service provisioning using the reduced set of new MCh widths.

33. The SDN controller of claim 32, wherein the network management system is further configured to receive traffic forecast data regarding an amount of traffic per node pair or line rate for use in a calculation of an expected traffic volume information per MCh width profile.

34. The SDN controller of claim 32, wherein the management system is further configured to monitor information regarding a fragmentation level measured in the network as a result of service provisioning using the reduced set of MCh channels, and to update, based on the fragmentation level information, a threshold value defining a maximum decrease in spectral efficiency.

35. The SDN controller of claim 32, wherein the management system is further configured to monitor information regarding optical performance of provisioned channels in the optical network and, in a circumstance when it is determined that there exists an insufficient optical performance on a given media channel, to recalculate a reduced set of new MCh widths under an additional constraint that a recalculated new MCh width of the given media channel is enlarged relative to a former new MCh width of the given media channel.

36. An off-line planning tool, configured for carrying out a method comprising the steps of:
- based on a topology of an optical network, generating a first set of original MCh widths for tentative use in the optical network, the first set of original MCh widths defining a target spectral efficiency; and
- generating a reduced set of new MCh widths from the first set of original MCh widths by respectively mapping each original MCh width, among the first set of original MCh widths, to a respective new MCh width, among the reduced set of new MCh widths, that corresponds to the mapped original MCh width;
- wherein each new MCh width, among the reduced set of new MCh widths, has a respective width that is at least as large as a respective width of the respective original MCh width that is mapped to the respective new MCh width, wherein at least a plurality of respective original MCh widths of the first set of original MCh widths are mapped to a same respective new MCh width among the reduced set of new MCh widths to thereby decrease a number of new MCh widths in the reduced set of new MCh widths relative to a number of original MCh widths in the first set of original MCh widths;
- wherein the mapping of the respective original MCh widths to the respective reduced set of new MCh widths is carried out automatically using a width adjustment module employing an optimization algorithm that:
  - penalizes a contemplated combination, in a contemplated new MCh width, of a plurality of original MCh widths, among the first set of original MCh widths, that is more likely to cause fragmentation problems in a resulting spectrum as compared to a contemplated alternative combination, in a contemplated new MCh width, of another plurality of original MCh widths among the first set of original MCh widths; and
  - at least one of:
    - penalizes a decrease in spectral efficiency, as compared to the target spectral efficiency, due to a contemplated mapping of an original MCh width among the first set of original MCh widths to a contemplated new MCh width that is larger in width than a width of the original MCh width with respect to which the mapping is contemplated;
    - penalizes a decrease in spectral width, as compared to the target spectral efficiency, due to a contemplated mapping of an original MCh width among the first set of original MCh widths to a contemplated new MCh width that is larger in width than a width of the original MCh width with respect to which the mapping is contemplated.

\* \* \* \* \*